Aug. 17, 1948.  R. A. KREUTZER  2,447,073
GRAPPLE FOR LIFTING MILK CANS
Filed Aug. 28, 1945

Inventor,
Robert A Kreutzer,

By
Attorneys

Patented Aug. 17, 1948

2,447,073

UNITED STATES PATENT OFFICE 2,447,073

GRAPPLE FOR LIFTING MILK CANS

Robert Arno Kreutzer, Menomonee Falls, Wis.

Application August 28, 1945, Serial No. 613,121

2 Claims. (Cl. 294—104)

The present invention relates to mechanical hoists and is more particularly concerned with an electrically driven hoist for lifting filled milk cans and the like.

The primary object of the invention is to provide construction employing current from a common feeder source of supply and using a mechanical hoist adapted to lift filled milk cans into and out of milk coolers.

Another object of the invention is to provide a mechanical hoist of simpler and more compact construction than that of prior devices.

With the foregoing and other objects and advantages in view, the invention consists of the novel construction and arrangement of parts hereinafter described and claimed.

In the accompanying drawings illustrating the invention,

Like numerals designate the same parts of construction shown and described.

Figures 1, 2:
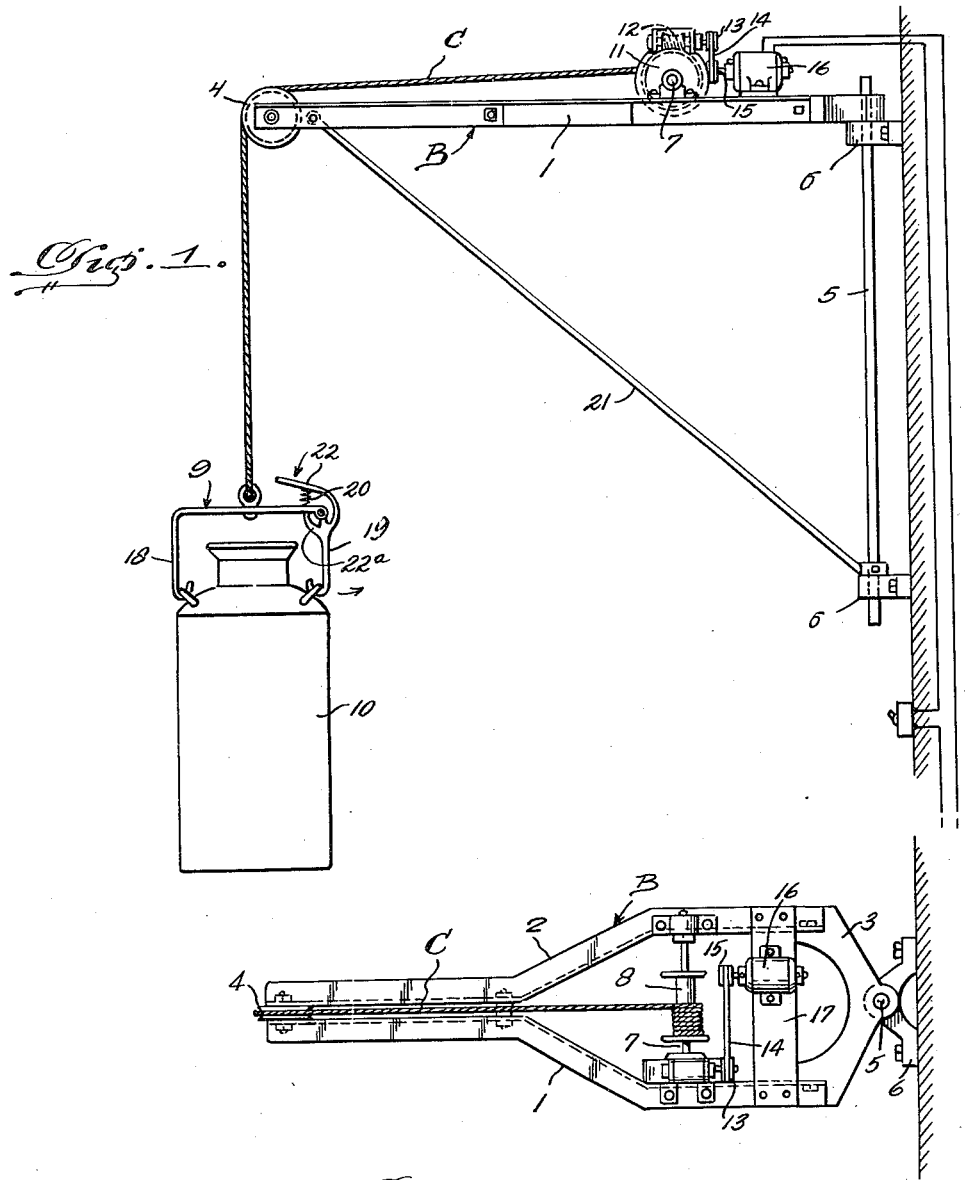
Figure 1 is a side elevation of the hoisting device.
Figure 2 is a top plan view thereof.

B indicates a horizontal boom constructed of convergent light steel L-beams 1 and 2 joined at the rear by a metallic yoke 3. This boom is provided at its outer end with a pulley 4 which is suitably journaled between the L-beams and at its inner end the boom is mounted on a vertical rod or mast 5 journaled in suitable wall brackets 6. An angularly-disposed brace rod 21 extends from a collar fastened on rod 5 to rest on the lower one of the brackets thence to a point adjacent the end of the boom where it is secured between the L-beams.

On top of the boom and adjacent its rear end a rotatable shaft 7 is mounted transversely in bearings on top of the L-beams and this shaft carries a spool 8 around which is wound a rope or wire cable C the free end of which is passed over the pulley 4 and has suspended therefrom a grappling iron 9 adapted to engage the handles of a milk can 10. Also mounted on the shaft 7 is a straight-tooth gear 11 adapted to mesh with a worm 12. On the shaft of the worm is mounted a pulley 13 which is driven by belt 14 from a pulley 15 on the motor-shaft. This motor 16 is mounted on a transverse plate or support 17 secured on the L-beams near their rear ends. The motor is connected with a source of electric supply and controlled by a conventional type of switch attached to the wall or other suitable support and adapted to start, stop and reverse the motor at will. When desired, pressure may be removed from the switch button operating the up or down movement of the cable and movement of the milk can stopped at any level.

The grappling iron consists of two members 18 and 19, and each is provided on the lower end with an upturned hook adapted to engage a handle of the milk can. Member 18 of the grappling iron is bent at right angles and provided on the upper end with an eye or aperture to which is pivotally connected the vertically-disposed member 19. The latter is forked at the top with one branch of the fork 22a bearing against the under side of member 18 and the other branch 22 held normally out of contact with member 18 by a coiled spring 20 interposed between the two. This spring holds the hook of member 19 in engagement with the handle of the milk can. To disengage the grappling iron the upper part of fork of member 19 is depressed.

In operation, a filled can may be attached to the hoisting cable and lifted off the ground or out of a truck and into a milk cooler or to another location. The boom is swung into position for the purpose. By pressing on the proper switch button the motor can be started and the cable wound up on the spool, thus lifting the milk can, or another button may be pressed and the milk can lowered. By pressing on still another switch button, all movement of the cable can be arrested.

Having thus described my invention what I claim as new and desire to secure by Letters Patent is:

1. A grapple or the like comprising two pivotally joined members provided with hooks at their lower extremities, a fork on one of said members having a branch adapted to engage the other of said members to limit the approach of said hooks, a second branch of said fork extending above the pivot point of said members and operable to separate said hooks.

2. In a grapple comprising two pivotally joined members provided with hooks at their lower extremities, means operable to move said hooks into and out of engagement with an object to be lifted including a fork on one of said members, one branch of said fork forming a handle extending above the pivot point of said members, a spring carried by said grapple in engagement with said handle effective to urge said hooks together, a second branch of said fork forming a stop to limit the approach of said hooks.

ROBERT ARNO KREUTZER.

REFERENCES CITED

The following references are of record in the file of this patent:

UNITED STATES PATENTS

| Number | Name | Date |
|---|---|---|
| 445,283 | Cleveland | Jan. 27, 1891 |
| 920,107 | Bolin | May 4, 1909 |
| 1,106,847 | Root | Aug. 11, 1914 |
| 1,355,050 | Kimball | Oct. 5, 1920 |
| 1,365,196 | Richardson | Jan. 11, 1921 |
| 1,413,891 | Beech | Apr. 25, 1922 |
| 1,488,455 | Chase | Mar. 25, 1924 |
| 2,107,500 | Price et al. | Feb. 8, 1938 |
| 2,349,531 | Weir | May 23, 1944 |